United States Patent
Moussa et al.

(10) Patent No.: US 6,742,043 B1
(45) Date of Patent: May 25, 2004

(54) REFORMATTING WITH MODULAR PROXY SERVER

(75) Inventors: Sarah C. Moussa, Sunnyvale, CA (US); Jay D. Logue, San Jose, CA (US)

(73) Assignee: Webtv Networks, Inc., Mountain View, CA (US)

( * ) Notice: Subject to any disclaimer, the term of this patent is extended or adjusted under 35 U.S.C. 154(b) by 0 days.

(21) Appl. No.: 09/483,682

(22) Filed: Jan. 14, 2000

(51) Int. Cl.⁷ .............................................. G06F 13/00
(52) U.S. Cl. ........................ 709/232; 709/246; 709/230
(58) Field of Search ................................. 709/230, 232, 709/203, 246

(56) References Cited

U.S. PATENT DOCUMENTS

| | | | |
|---|---|---|---|
| 5,918,013 A | | 6/1999 | Mighdoll et al. |
| 5,935,207 A | | 8/1999 | Logue et al. ................ 709/219 |
| 5,978,381 A | | 11/1999 | Perlman et al. ............. 370/432 |
| 5,983,273 A | | 11/1999 | White et al. ................ 709/229 |
| 6,101,328 A | * | 8/2000 | Bakshi et al. ............... 717/170 |
| 6,247,050 B1 | * | 6/2001 | Tso et al. .................... 709/224 |
| 6,278,449 B1 | * | 8/2001 | Sugiarto et al. ............. 345/334 |
| 6,311,215 B1 | * | 10/2001 | Bakshi et al. ............... 709/221 |
| 6,401,132 B1 | * | 6/2002 | Bellwood et al. ........... 709/246 |
| 6,421,733 B1 | * | 7/2002 | Tso et al. .................... 709/246 |
| 6,611,876 B1 | * | 8/2003 | Barrett et al. ............... 709/246 |
| 6,615,212 B1 | * | 9/2003 | Dutta et al. .................... 707/10 |

OTHER PUBLICATIONS

U.S. patent application Ser. No. 09/295,746, Park et al., filed Apr. 20, 1999.
U.S. patent application Ser. No. 09/238,133, Evans et al., filed Jan. 26, 1999.
Dale Rogerson, "Inside COM Microsoft's Component Object Model", Microsoft Press, pp. v–xxiii and 1–376 (1997).

* cited by examiner

Primary Examiner—Kenneth R. Coulter
(74) Attorney, Agent, or Firm—Workman Nydegger

(57) ABSTRACT

A proxy server "platform" is provided that is easily modified and customized to reformat web content in a particular way under certain conditions as determined by the operator of the proxy server. The proxy server retrieves from the Internet web content requested by a client, reformats it into a suitable format for the requesting client, and then forwards the reformatted web content to the requesting client. The proxy server evaluates operator-alterable rules to determine, based on capabilities of the requesting client (and/or on request variables), specifically how to reformat the requested web content so that it will be suitable for passing on to the requesting client. The platform has a "modular" architecture wherein content reformatting is performed by one or more "modules". The modules are dynamically-linkable into the executing proxy server platform software at run time. The platform is easily customizable by the operator because modules can be deleted and/or added without affecting other modules. Modules are, in one embodiment, written in accordance with the COM modular programming standard so that individual modules can be removed, replaced and/or added without having to modify or recompile other modules. In one embodiment, web content cached on the proxy server is deemed suitable for passing to a requesting client if evaluation of the rules for the request from the client matches the prior evaluation of the rules that gave rise to the original reformatted web content as cached.

21 Claims, 5 Drawing Sheets

```
if ( content-type = "JPEG" & screen = "TV" )
{
ImageCRM ( jpeg_qualify = 55, jpeg_smooth = TRUE,
xres = 800, yres = 600, jpeg_entropy_optimize = TRUE );
} if ( content-type = "JPEG" & screen = "monitor" )
{
ImageCRM ( jpeg_quality = 70, jpeg_smooth = FALSE,
xres = 1024, yres = 768, jpeg_entropy_optimize =
 TRUE );
} if ( content-type = "JPEG" & client = "Foo2.2" )
{
ImageCRM ( forced-format = "GIF" );
// Foo2.2 client has problems with JPEG decoding
} if ( content-type = "JPEG" & client = "PalmPilot" )
{
ImageCRM ( jpeg_quality = 50, jpeg_colorspace =
"greyscale", xres = 200, yres = 300 );
}
```

FIG. 6

REFORMATTING WITH MODULAR PROXY SERVER

BACKGROUND INFORMATION

FIG. 1 (Prior Art) is a diagram of a system 1, known as the WebTV Network, that provides multiple WebTV clients 2–4 access to the Internet 5 via a WebTV server 6. WebTV clients 2–4 are WebTV set-top box Internet Terminals available from WebTV Networks Inc., of Mountain View, Calif. WebTV server 6 functions as a "proxy server" on behalf of clients 2–4 for purposes of accessing the Internet. Details of this WebTV Network including the proxy server are set forth in U.S. Pat. No. 5,918,013, and U.S. Pat. No. 5,935,207.

In one operational example, client 2 attempts to access web content (for example, an HTML document) located on a remote server 7 of the Internet. Client 2 issues a request identifying the desired HTML document to WebTV server 6. If the requested HTML document is stored in a proxy cache 8 on the WebTV server, then WebTV server 6 responds to client 2 by sending the requested HTML document as stored in its proxy cache 8 back to client 2. A browser on client 2 then renders the HTML document such that the document is displayed on the display of client 2. In this sense, WebTV server 6 is a proxy server.

If, on the other hand, the requested HTML document is not present in proxy cache 8, then WebTV server 6 issues a request for the HTML document to remote server 7. Remote server 7 responds by sending the HTML document back to WebTV server 6. WebTV server 6 in turn sends the HTML document to the client 2 that initially made the request. The browser on client 2 then renders the HTML document such that it is displayed on the display of client 2. If the HTML document is a document that is likely to be accessed frequently by clients 2–4, then WebTV server 6 may store a copy 9 of the HTML document in proxy cache 8.

WebTV server 6 also serves to reformat web content. In one example, client 2 attempts to access image data from remote server 7. The image data is, however, in an image format inappropriate for client 2. The requested image data on remote server 7 is, for example, inappropriate in the sense that it is in a format that client 2 cannot decipher and display. Were client 2 to attempt to display this image data, client 2 would fail or would not be able to display the image.

Alternatively, the image data is inappropriate in the sense that the image data is of higher resolution than is necessary. Client 2 may, for example, use a television screen as a display device. An ordinary television generally has a lower pixel resolution than do many computer monitors. Because much of the image data on the Internet is for display on computer monitors, many images on the Internet have relatively high resolution image data which need not be transferred to the low resolution displays of clients 2–4.

If such inappropriate or unnecessary image data from remote server 7 were merely passed through WebTV server 6 in the same format, then client 2 would receive the inappropriate or unnecessary image data. If client 2 could not decipher the format, then client 2 may fail or not be able to display the image. If there were a large amount of high resolution image data that client 2 cannot display, then the communication of the image data to client 2 may take an unnecessarily large amount of time.

WebTV server 6 therefore includes software 10 called a "transcoder" that reformats the image data from the inappropriate format into an appropriate format. Client 2 first issues to WebTV server 6 a request for the image data on remote server 7. Assuming that the image data is not cached in proxy cache 8, WebTV server 6 issues a request for the image data to remote server 7. Remote server 7 responds by sending the image data in the inappropriate format to WebTV server 6. Transcoder software 10 reformats the image data into the appropriate format that client 2 can decipher. WebTV server 6 then sends the reformatted image data to client 2. Client 2 can therefore access image data from the Internet even though that image data as it is available on remote server 7 on the Internet is not in a format that client 2 can decipher and display.

Not only does WebTV server 6 reformat image data, but WebTV server 6 also reformats (i.e., "rewrites") the HTML of HTML documents. Consider a situation in which the requested web content on remote server 7 is an HTML document that contains a "bug" or a "quirk". A bug may cause a browser of a client to fail. A quirk may cause a browser of a client to exhibit undesirable or unexpected features, even though the browser may not crash. WebTV server 6 therefore includes software 11 called an "HTML rewriter" that rewrites offending parts of the HTML to eliminate such bugs and quirks.

In an operational example, client 2 issues to WebTV server 6 a request for a desired HTML document. Assuming that the desired HTML document is not cached in proxy cache 8, WebTV server 6 issues a request for the desired HTML document from remote server 7. Remote server 7 responds by sending the HTML document with the bug or quirk back to the WebTV server 6. Rather than sending the HTML document with the bug or quirk back to clients 2–4, HTML rewriter software 11 reformats (rewrites) the HTML to eliminate the bug or quirk. The WebTV server 6 then sends the reformatted HTML document without the bug or quirk back to client 2 so that the browser on client 2 can render the HTML document without incident.

HTML rewriter software 11 also functions to reduce or eliminate a dead time ("perceived latency") sometimes experienced by a user of client 2. The browser in client 2 can start to render a web page involving an image if the browser has size information for the image. If the browser has size information for the image, then the browser can begin to lay out the background page leaving a blank of the appropriate size for the image data yet to arrive. If the browser does not have such size information, then client 2 experiences a dead time ("perceived latency") from the time the request of the web page is made until the image data for the image is actually received on the client and the browser begins to render the page. To avoid this perceived latency at the client, WebTV server 6 stores size information relating to the image in cache 8. When client 2 requests a web page involving an image, WebTV server 6 retrieves the size information from its cache, rewrites the HTML of the web page to include the size information, and then relays the HTML on to client 2. The browser in client 2 can therefore begin to render the web page using the size information for any images on the web page when it receives the HTML for the background page. The browser does not have to wait until it deciphers the HTML of the background page, identifies the image tag, issues a request for the image data identified by the image tag, and receives the actual image data with the size information. The size information is received along with the original HTML. The result of the rewriting of the HTML therefore results in a reduction in "perceived latency" at client 2.

The code of WebTV server 6 presently commercially employed is a monolithic piece of code that typically supports clients of a single type (i.e. WebTV Internet Terminals running particular software). It is inflexible and difficult to adapt and modify. For example, it is difficult to adapt the code to reformat content one way for requesting clients of a first type but to reformat content a second way for requesting clients of a second type. Such a modification would generally require recompiling much or all of the WebTV server code. It would require an intimate knowledge of the inner workings of the WebTV server code. WebTV server 6 is therefore not considered to be well suited for operation, maintenance and customization by an independent operator (an operator other than WebTV that is not intimately familiar with the inner workings of the monolithic code). A WebTV server platform is desired that can be operated by such an independent operator such that the operator can relatively easily modify, delete and/or add to part of the platform software without changing other parts of the platform software, and without having to have a detailed knowledge of the inner workings of the platform software.

SUMMARY

A proxy server "platform" is provided that can be easily modified, customized, and maintained by an interactive television service operator (the "operator") not intimately familiar with the inner workings of the proxy server. The platform has a "modular" architecture wherein content reformatting is performed by one or more "modules". The modules are dynamically-linkable into the executing proxy server platform software at run time. The operator can delete modules and/or add modules to customize proxy server operation. In one embodiment, the modules are written in accordance with the COM modular programming standard so that individual modules can be removed, replaced and/or added without having to modify or recompile other modules. Individual modules can have different authors. Modules can be written by the operator, or by WebTV, or by another entity. Regardless of module author, the modules can be made to work together in the proxy server platform provided that the COM standard is followed in realizing the individual modules.

In accordance with one aspect, the proxy server uses information indicative of "client capabilities" of the requesting client to determine which modules will process the content before the content is relayed to the requesting client. A first client issues a first request to a proxy server for web content stored on a remote server. The first request contains information indicative of "client capabilities" of the first client (for example, the hardware capabilities of the first client and a software version number and software build number). The proxy server uses information indicative of the client capabilities to determine a first format appropriate for the first client. If the requested web content is cached on the proxy server in this first format, then the proxy server sends the web content to the first client. If the requested content is not cached in the first format, then proxy server uses appropriate modules to reformat the web content into the first format. Once reformatted, the web content is sent to the requesting first client. If the web content is not cached on the proxy server or if for some other reason the cached web content is not to be used (for example, it is too old), then the proxy server issues a request for the web content to the remote server, and retrieves the web content. If the web content is not in the first format, then the proxy server uses appropriate modules to reformat the web content into the first format. Once reformatted, the proxy server sends the web content back to the requesting first client.

Next, a second client having different client capabilities from the first client issues a second request to the proxy server for the web content. The second request includes information indicative of the client capabilities of the second client. The proxy server receives this second request and uses the information indicative of the client capabilities of the second client to determine a second format appropriate for the second client.

If the requested web content is cached on the proxy server in this second format, then the proxy server sends the web content to the second client. If the requested content is not cached in the second format, then proxy server uses appropriate modules to reformat the web content into the second format. Once reformatted, the web content is sent to the requesting second client. If the cached web content is not to be used (for example, it is too old), then the proxy server issues a request for the web content to the remote server, and retrieves the web content. If the web content as retrieved from the remote server is not in the second format, then the proxy server uses appropriate modules to reformat the web content into the second format. Once reformatted, the proxy server sends the web content back to the requesting second client. It is therefore seen that the proxy server determines the format in which the web content will be sent back to the requesting client based at least in part on information indicative of the client capabilities of the requesting client.

In accordance with another aspect, the proxy server includes a first module and a second module. The first module reformats content the first way whereas the second module reformats content the second way. The first module, and not the second module, reformats the web content supplied to the first client. The second module, and not the first module, reformats the web content supplied to the second client. Each of the first and second modules is a portion of executable code that is independently dynamically-linkable into the proxy software at run time.

In accordance with yet another aspect, the determination of the type of reformatted content to supply to a given requesting client is made using a set of operator-alterable rules. First, the proxy server receives the information indicative of the client capabilities in the HTTP header or form data of the request. The proxy server uses this information to look up a set of client capabilities from a look-up table or database. The client capabilities so determined are then in turn used as inputs for a subsequent evaluation of the operator-alterable rules. The evaluation of the rules determines, for a requesting client having particular client capabilities, which modules will process the requested web content and/or how those modules will process the requested web content. The rules are written in a relatively easy to understand textual form. The rules in this textual form are then read into the proxy server software such that the operation of the various modules is changed without modifying the code of the modules themselves. The operator need not have a detailed knowledge of the inner workings of the modules, to alter the rules, and/or to add or delete modules.

The modular reformatting software can be used by applications other than a proxy server application. In one aspect, an email server application uses the reformatting software to reformat email attachments from a first format unsuitable for a client to whom the email is addressed into a second format that is suitable for the client to whom the email is addressed. Due to the reformatting, the email client is able to read the email attachment where had the attachment not been reformatted, the client could not read the attachment. The reformatting server uses information indicative of client capabilities of the email client that are passed to the server by the client to determine how to reformat the attachment so that it is in an appropriate format for the client.

Other aspects of the invention and other embodiments are described in the detailed description below. This summary does not purport to define the invention. The invention is defined by the claims.

BRIEF DESCRIPTION OF THE DRAWINGS

FIG. 6 is a diagram of an example of text file 410 of rules.

DETAILED DESCRIPTION

Figure 1:
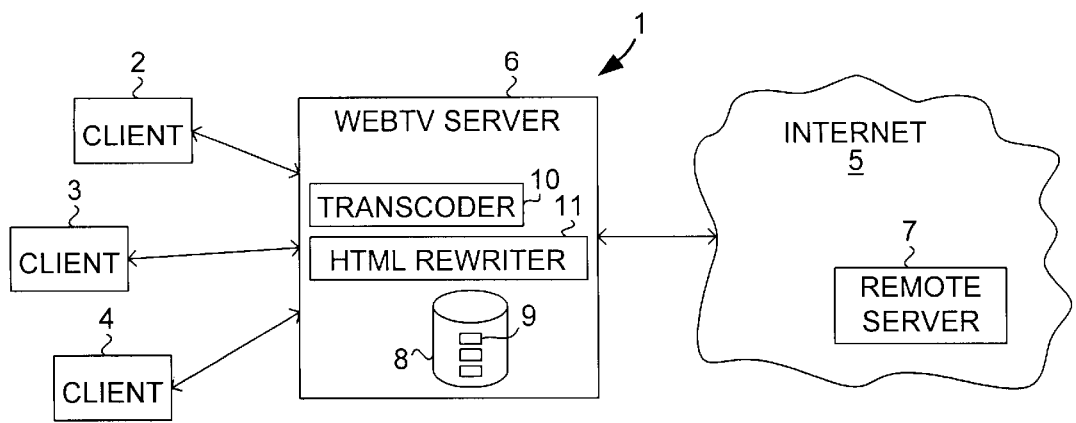
FIG. 1 (Prior Art) is a diagram of a prior art network involving a proxy server that reformats content.
Figure 2:
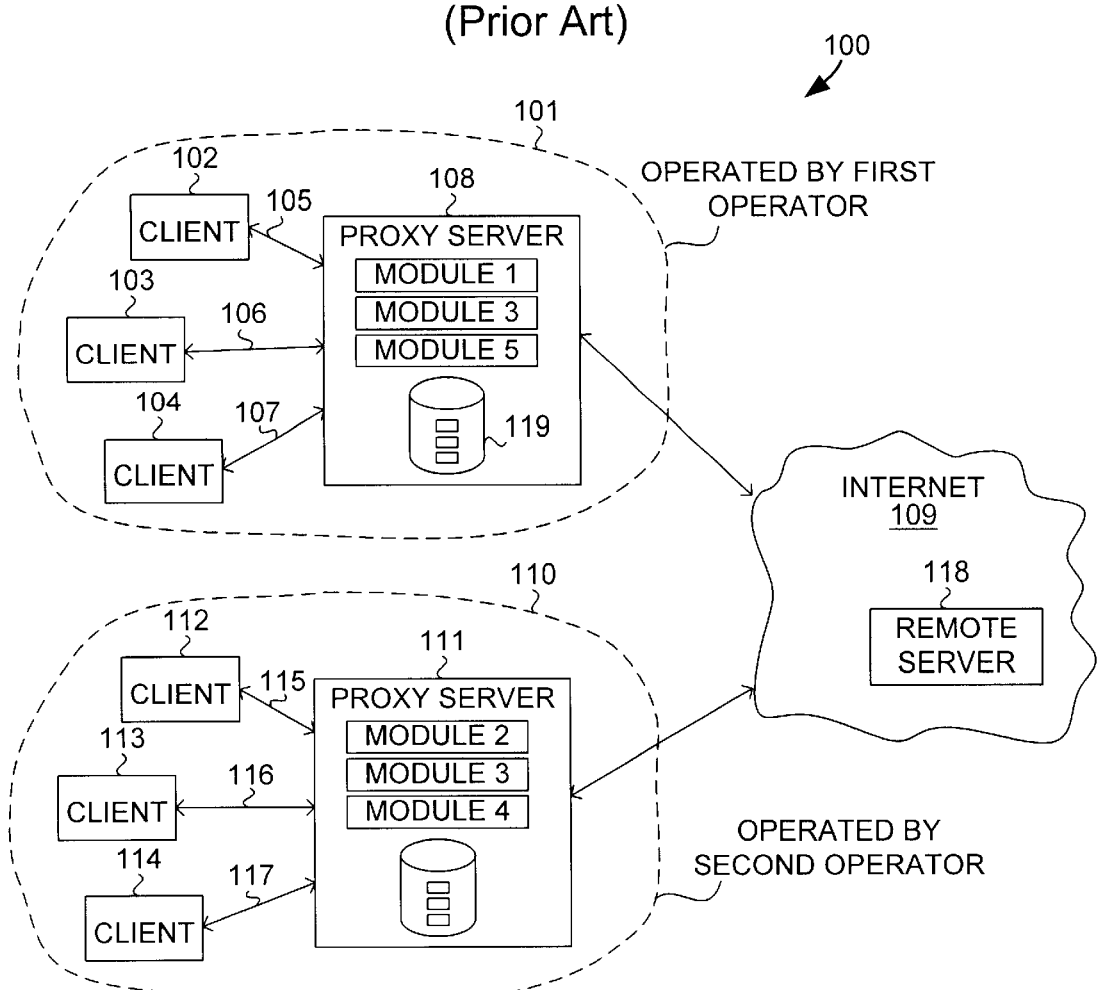
FIG. 2 is a diagram of a system 100 in accordance with one aspect of the invention.

FIG. 2 is a diagram of a system 100 in accordance with one aspect of the present invention. System 100 includes a first interactive television network 101 that includes a plurality of clients 102–104. Clients 102–104 are coupled via client-to-server connections 105–107 and a first modular proxy server 108 to the Internet 109. Client-to-server connections 105–107 can be of any suitable type including dial-up connections, ISDN connections, T1 connections, DSL connections, or cable-modem connections. First proxy server 108 is operated by a first operator. The users of clients 102–104 are customers of the first operator who typically pay the first operator for various services provided including the ability of access the Internet 109 via first modular proxy server 108. In the example of FIG. 2, first interactive television network 101 is the WebTV network and clients 102–104 are WebTV set-top Internet Terminals available from WebTV Networks, Inc. of Mountain View, Calif. The operator of first proxy server 108 is therefore WebTV Networks, Inc. of Mountain View, Calif. For additional information on a WebTV set-top box Internet Terminal see: U.S. patent application Ser. No. 09/295,746, now U.S. Pat. No. 6,460,180 and U.S. patent application Ser. No. 09/238,133 (the subject matter of these applications is incorporated herein by reference). For additional general information on a proxy server of the structure and operation of a client-server interactive television network, see: U.S. Pat. No. 5,918,013 and U.S. Pat. No. 5,935,207 (the subject matter of these patents is incorporated herein by reference).

In accordance with one aspect of the present invention, a second interactive television network 110 is provided wherein the software on proxy server 111 of the second network 110 shares a high degree of commonality with the software on proxy server 108 of the first network, but wherein the second network 110 is operated by a second operator. The software of proxy server 108 of the first network 101 and the software of proxy server 111 of the second network 110 is an adaptable and customizable modular software platform, the software platform being adapted and customized a first way for operation as first proxy server 108 in first network 101, the software platform being adapted and customized a second way for operation as second proxy server 111 in second network 110.

Even though the same platform software is executed on proxy servers of the two networks 101 and 110, the two networks are separate and different networks from the perspective of the users of the two networks. The commonality of the internal workings of the proxy servers of the two networks is not readily apparent to the users of either of the two networks. The users of second network 110 are customers of the second operator, not of the first operator. In the example of FIG. 2, clients 112–114 are interactive television Internet terminals of different make and construction than clients 102–104. Clients 112–114 are coupled via connections 115–117 and second modular proxy server 111 to the Internet 109.

Figure 3:
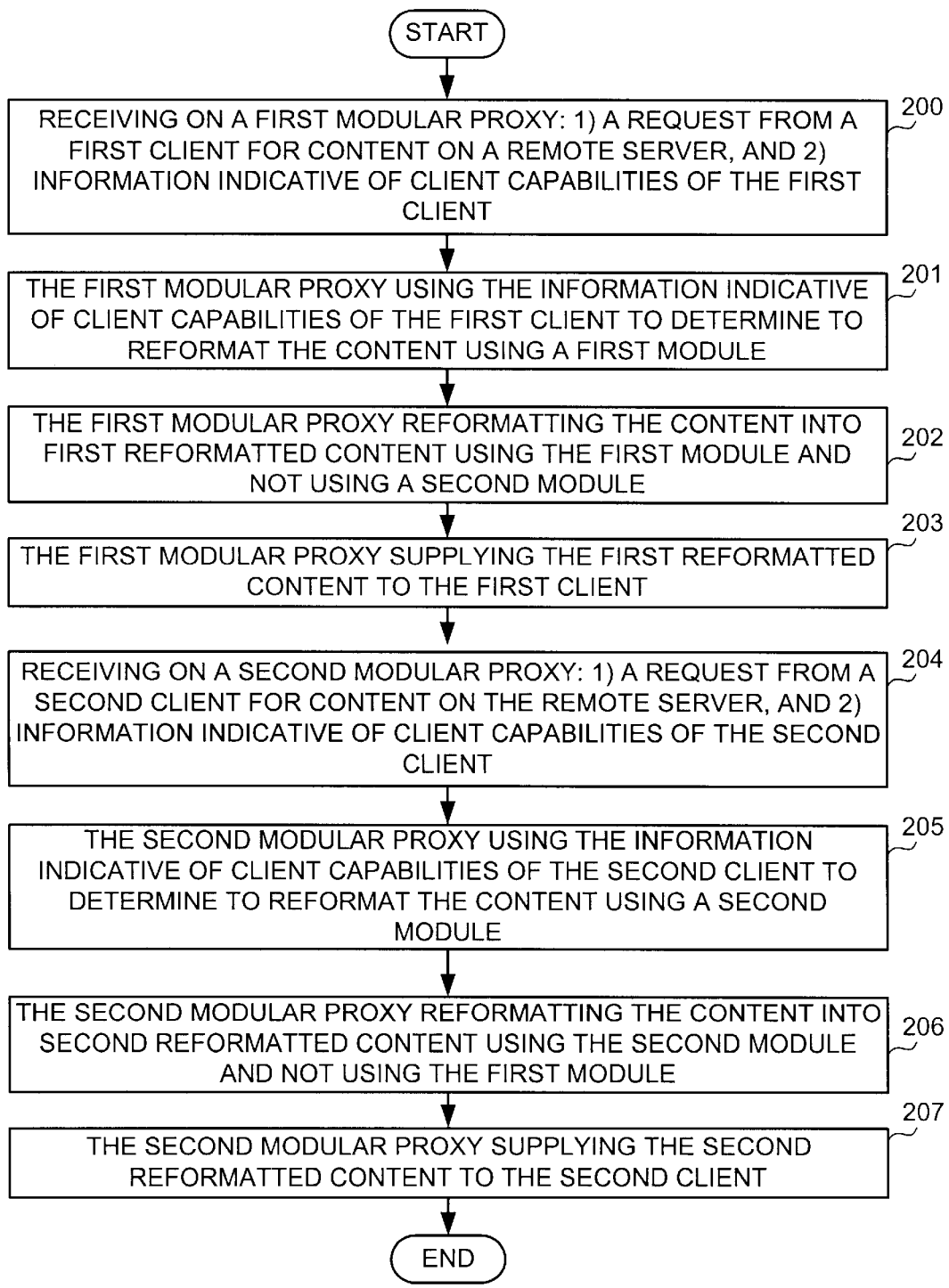
FIG. 3 is a flowchart of a method in accordance with an operation of the system 100 of FIG. 2.

FIG. 3 is a flowchart of a method in accordance with an operation of the system 100 of FIG. 2. Clients 102–104 of the first network 101 are clients that can best utilize web content on a remote server 118 when that web content is provided in a first format. Clients 112–114 of the second network 110, on the other hand, are clients that can best utilize the web content on the remote server 118 when that web content is provided in a second format.

In one example, the displays of clients 102–104 are of a smaller resolution than are the displays of clients 112–114. The web content on remote server 118 is image data for an image, the image data being of higher resolution than can be displayed on the displays of either clients 102–104 or clients 112–114. Accordingly, to reduce the amount of image information that needs to be transferred to a client that requests the image data, a greater reduction in the amount of image data is performed where the image data is to be supplied to clients 102–104 than where the image data is to be supplied to clients 112–114. A first dynamically-linkable image-reformatting module (MODULE 1) that was originally provided along with the modular proxy server software platform performs the appropriate amount of reduction for clients 102–104. The first operator of first network 101 therefore uses this MODULE 1 to reformat the image data. The image data is, however, reformatted for the clients 112–114 of the second network 110 using a custom dynamically-linkable image-reformatting module (MODULE 4) that is specially written for this purpose by the second operator. The original image-reformatting module (MODULE 1) supplied with the platform has been removed from second proxy server 111, and the specially-written MODULE 4 has been substituted. The two modules (MODULE 1 and MODULE 4) are dynamically-linkable modules written in accordance with the COM programming standard.

In a first step 200 (see FIG. 3), the first modular proxy 108 receives: 1) a request from first client 102 for the web content on remote server 118, and 2) information indicative of client capabilities of the first client. The information indicative of client capabilities may, for example, be contained in the header or form data of the HTTP request. The information indicative of client capabilities may be client capabilities passed to the proxy 108 by the client, or the information indicative of client capabilities may be other information that is usable to determine client capabilities. In this example, the information is information indicative of the particular resolution of the display (a browser type, software version number, and a software build number) of first client 102. It is not the resolution of the display, although it could be in some embodiments.

In a second step 201, the first modular proxy 108 uses this information indicative of the capabilities of client 102 to determine to reformat the requested web content using its image-reformatting module (MODULE 1). From the information indicative of client capabilities, the first proxy 108 in this example determines that the first client has a display of a particular resolution and therefore is best provided with image data reformatted by MODULE 1. If the requested web content is not present on the first proxy 108, then the first proxy 108 issues a request to the remote server 118 for the web content. The remote server 118 responds by sending the requested web content (in this case, image data) back to the first proxy server 108.

Next (step 202), the first proxy server 108 reformats the web content into first reformatted content using the first module (MODULE 1) and not using a second module (MODULE 4). In this example, the first reformatted content is of appropriate resolution for the display of client 102. The first proxy server 108 then (step 203) sends the first reformatted content back to the requesting first client 102.

Next (step 204), the second modular proxy server 111 of the second network 110 receives: 1) a request from a second client 112 for the web content on remote server 118, and 2) information indicative of the client capabilities of the second client 112. In this example, the information is contained in the header of the request and is indicative of the resolution of the display of the second client 112.

Next (step 205), the second modular proxy server 111 uses the information indicative of the client capabilities of second client 112 to determine to reformat the requested web content using a second module (MODULE 4). In this example, the second module reformats the requested image data to have an appropriate resolution for the resolution of the display of second client 112. If the requested web content is not present on second proxy server 111, then second proxy server 111 issues a request for the web content to the remote server 118. Remote server responds by sending the requested web content back to the second proxy server 111. The second modular proxy server 111 then reformats (step 206) the web content into second reformatted content using the second module (MODULE 4) and not using the first module (MODULE 1). The second modular proxy 111 then supplies (step 207) the second reformatted content to the second client 112. It is therefore seen that the first instance of the proxy server platform in a first network 101 reformats the requested web content using a particular module (MODULE 1), whereas the second instance of the proxy server platform in a second network 110 reformats the very same requested web content using a different module (MODULE 4).

Figure 4:
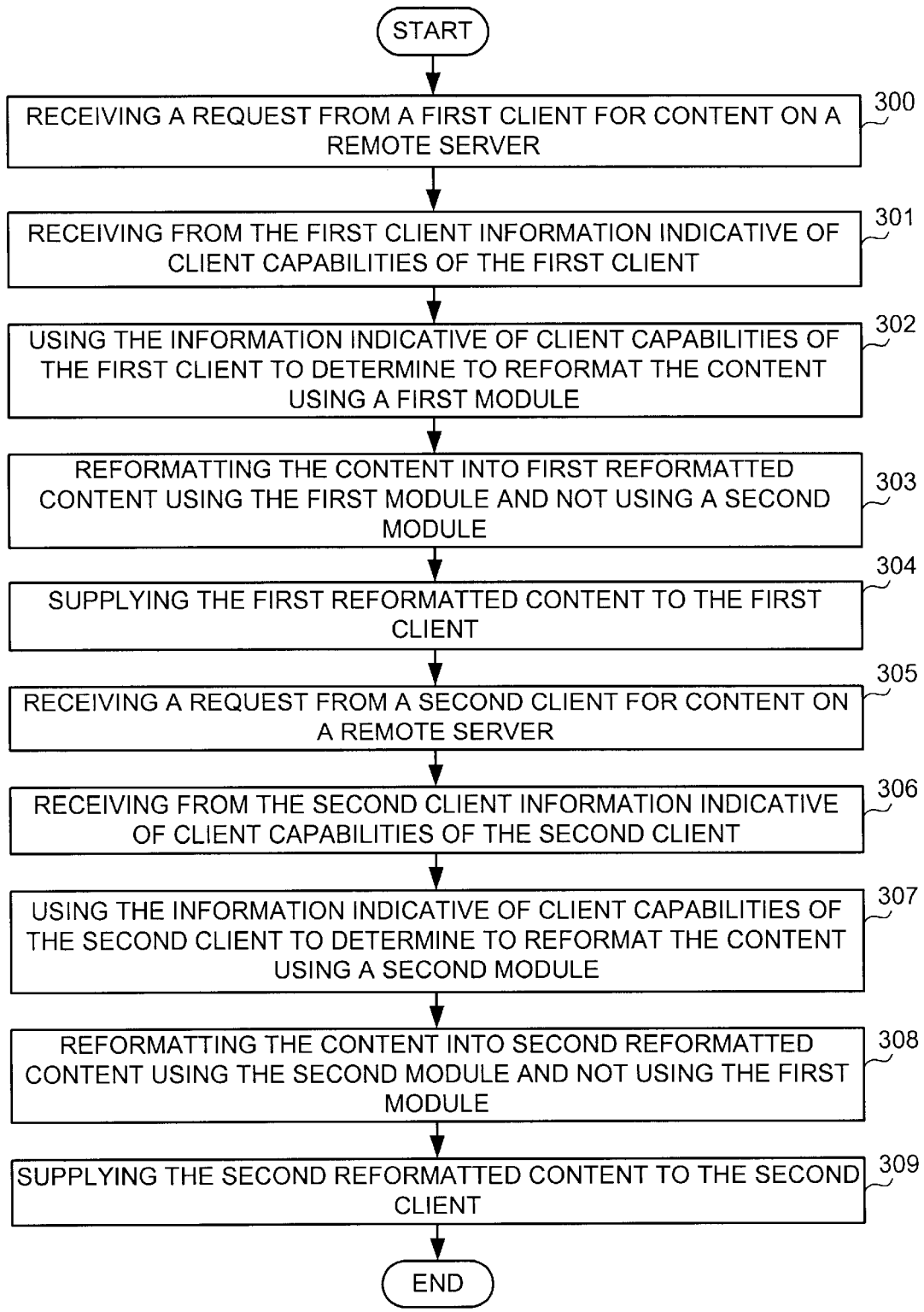
FIG. 4 is a flowchart of another method in accordance with an operation of the system 100 of FIG. 2.

FIG. 4 is a flowchart of another method in accordance with an operation of the system 100 of FIG. 2. In this method, web content is formatted in different ways within the same interactive television network depending on the different client capabilities of the requesting clients.

In a first step (step 300), modular proxy server 108 receives a request from a first client 102 for web content on remote server 118. The modular proxy server 108 also receives (step 301) from first client 102 information indicative of the client capabilities of the first client 102. The information indicative of client capabilities is, in this example, present in the header of the request and indicates that first client 102 is enabled to handle compressed image data in a first compression format.

Next (step 302), modular proxy server 108 uses the information indicative of client capabilities to determine to reformat the requested web content using a first module (MODULE 1). This first module may, for example, reformat the image data into compressed image data in the first compression format.

If the requested web content is not present on proxy server 108, then proxy server 108 issues a request for the web content to remote server 118. Remote server 118 responds by sending the requested web content back to proxy server 108. Modular proxy server 108 then reformats the web content (step 303) into first reformatted content using the first module (MODULE 1) and not using a second module (MODULE 3). In this example, the first reformatted content is image data in the first compression format. Once generated, this first reformatted content is supplied (step 304) back to the requesting first client 102. The image data is therefore in the first compression format preferred by the first client 102.

Next, the modular proxy server 108 receives a request from a second client 103 of the network 101 for the same web content on remote server 118. The modular proxy server 108 also receives (step 306) information indicative of client capabilities of the second client 103. Again, this information may be present in the header of the request.

Modular proxy server 108 then uses the information indicative of client capabilities of the second client 103 to determine to reformat the web content using the second module (MODULE 3). The requested web content, having already been retrieved by the proxy server 108, is likely cached in its original form (as stored on remote server 118) in cache 119 of server 108. If the web content so cached is not too old, then proxy server 108 uses this content and does not need to retrieve the web content from the remote server 118. Otherwise, proxy server 108 issues a request to remote server 118 for the web content. Remote server 118 responds by sending the requested web content back to proxy server 108.

Next (step 308), modular proxy server 108 reformats the web content into second reformatted content using the second module (MODULE 3) and not using the first module (MODULE 1). The second module in this example reformats image data into compressed image data in a second compression format preferred by second client 103. Once the second reformatted content is generated, the modular proxy server 108 supplies (step 309) the second reformatted content to the second client 103. Accordingly, in this method it is seen that the modular proxy server reformats the web content one way using a first module when the web content is requested by a first client having first client capabilities, but reformats the same web content a second way using a second module when the web content is requested by a second client having second client capabilities. The first client may, for example, be an unsophisticated device (for example, a PalmPilot, a personal organizer, or a cellular telephone) that does not have the ability to decode a compressed format of the second type. The second client may, for example, be a WebTV Internet Terminal that does have the ability to decode a compressed format of the second type.

Figure 5:
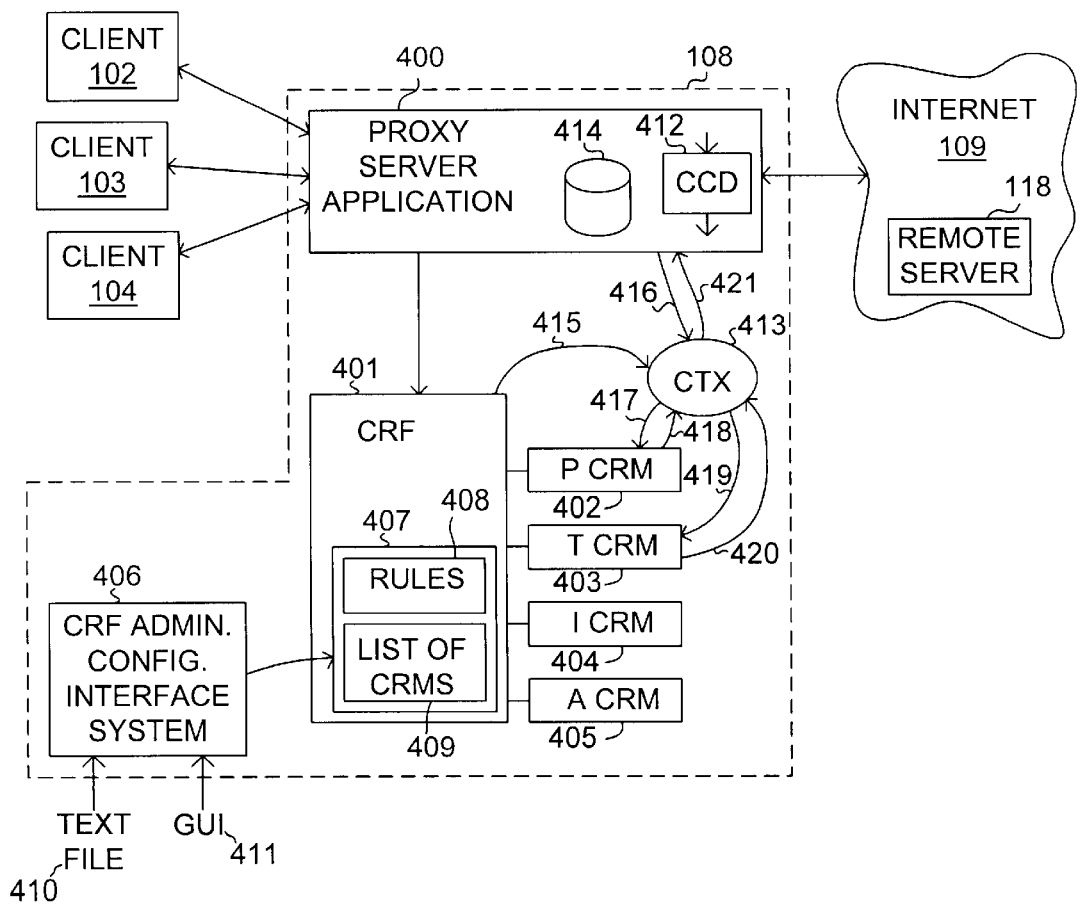
FIG. 5 illustrates an operational example of the modular proxy server 108 of the system 100 of FIG. 2.

FIG. 5 illustrates an operational example of modular proxy server 108 where client 102 requests an HTML web page which in turn contains an image. The image data for the image is of higher resolution than can be displayed on the screen of the requesting client 102. The HTML image tag for the image does not contain size information for the image so the above described "perceived latency" problem associated with rendering the background page would be experienced on client 102 if the HTML were forwarded to the client without the missing size information.

Modular proxy server 108 includes a proxy server application 400, a content reformatting (CRF) object 401, multiple content reformatting module (CRM) objects 402–405, and a CRF administration configuration interface system (CACIS) 406. CRF 401 controls the content reformatting process. CRF 401 has an associated configuration object 407 which stores information about how content reformatting is to be done on that particular server. This information includes a set of rules 408 and a list 409 of the CRMs (and any sub-CRMs) present.

The rules 408 are entered into CACIS 406 by the operator in either text form as a human-readable text file 410 or via a graphical user interface (GUI) 411. CACIS 406 in turn loads the rules into the rules portion 408 of configuration object 407. Each rule has a condition (set of boolean expressions) and a resultant expression. The resultant expression is a list of CRMs (usually only one but there could be several) with the input parameters to pass to each CRM. All rules that evaluate to TRUE are executed, and the order of execution of the rules follows the order the rules as they appear in text file 410.

FIG. 6 is an example of text file 410. When proxy server 108 is initialized, CACIS 406 reads text file 410 and then loads the rules into the rules portion 408 of the configuration object 407. The CACIS 406 also loads the list 409 with a list of the CRMs 402–405 that are present.

The rules 408 are evaluated at run time using request variables and/or client capabilities as inputs. Request variables include content-length, content-type and user-agent. (Even though the content-length and content-type do not directly come from the request itself but rather come from the response to the request, they are nonetheless considered "request variables" because they relate to the request in the sense that they describe the information requested by the request.) The client capabilities are operator extensible. For each variable there are acceptable values or ranges of values.

Although client capabilities can be passed from the client to the proxy server in the request in some embodiments, the client capabilities are in the presently described embodiment determined by the proxy server application 400 using a client-capabilities database (CCD). Information indicative of client capabilities (for example, a browser identifier for the browser executing on the requesting client, a software version number of the browser software, and a software build number of the browser software) received from the requesting client is used to look up corresponding client capabilities of the requesting client. In the present example, a browser identifier, a software revision number, and a software build number are present in the header of the request as received from client 102. The information is of the form: WebTV-1.2-XXXX. The "WebTV" portion is the browser identifier. Other possibilities include "Netscape" and "Mozilla". The "1.2" portion is the software revision number. The "XXXX" portion is a four digit software build number. In the present example, proxy server application 400 determines from this information indicative of client capabilities that client 102 has particular values for each of the following "client capabilities": display resolution in the x dimension (the horizontal dimension); display resolution in the y dimension (the vertical dimension); color scheme; bit depth; connection speed; type of connection; amount of memory, amount of cache memory, amount of disk space; processor speed; image formats supported; audio formats supported; whether the client supports stereo audio or just mono audio.

Once the client capabilities and the request variables (content length, content type, and user agent) are known for the particular request, proxy server application 400 calls the method "CreateNewContext" 415 using this information as inputs in order to create a context object (CTX) 413 for the new transformation. (The term "transformation" here is used to denote the reformatting operation.) CRF 401 then queries the new CTX 413, obtains the interface pointer (a handle to CTX 413), and gives it to the proxy server application 400. Once created, CTX 413 is the object that proxy server application 400 communicates with.

In this example, the requested HTML document is not cached in cache 414. Proxy server 108 therefore issues a request for the HTML document to remote server 118. Remote server 118 responds by sending the HTML back to proxy server 108. As the HTML (data) begins to stream back into the proxy server 108, the proxy server application 400 calls a "PushData" function 416 on CTX 413 with an indicator. The indicator either indicates that more data will be coming later (as in the case of data streaming), or that all the data has now been pushed to the context. CTX 413 uses a reference to configuration object 407 to cause an evaluation of the rules 408 using the determined client capabilities and request variables. The result of this rule evaluation is: 1) an ordered list of the CRMs that will be used to process the HTML where the order indicates the order in which the CRMs will be used, and 2) input control parameters for each CRM that control how the CRM will perform. Operation of an individual CRM is controlled by the input control parameters passed to it.

The CRMs used for processing the HTML in this example is a page patcher CRM 402 and a tokenizer CRM 403. One of the input control parameters to the page patcher CRM 402 is a list of structures, each of the structures defining a particular page patch that is to be performed. The tokenizer CRM does not receive any input control parameters.

CTX 413 goes to the first CRM in the ordered list and creates a state (not shown) by calling CreateNewState on the CRM. (There is a new state for every operation carried out by a CRM). CTX 413 then passes the appropriate input control parameters to that CRM and calls the function "process data" 417 on the state. In this example, the first CRM in the ordered list is page patcher CRM 402. If the client 102 is known to have problems with a particular HTML sequence, then the page patcher CRM 402 looks for that particular offending sequence in the HTML and replaces it with an acceptable sequence. That data then goes back 418 to CTX 413. CTX 413 proceeds to the next CRM in the ordered list (which in this case is the tokenizer CRM 403), creates a state (not shown) on tokenizer CRM 403, and calls 419 the function "process data" on the tokenizer state.

In the present example, the image tag on the HTML web page as received from remote server 118 does not have image size information. Accordingly, client 102 will experience a "perceived latency" if it were to try to render the background page as the HTML is received on the client 102 because the client would not at that time have the size information for the image. If, on the other hand, the HTML contained the size information then client 102 could start to render the background page using the size information in the image tag before the client had actually received the image data itself. To eliminate this "perceived latency" in the rendering of the background page, tokenizer CRM 403 inserts the size information into the HTML before the HTML is passed back to client 102.

Accordingly, the tokenizer state searches through the HTML tags for the image tag, obtains the image name from the image tag, uses the image name to look in cache 414 for the size information for that particular image that has been previously stored, and then adds characters H=__, W=__ into the stream of HTML at the appropriate place so that the HTML image tag indicates the size of the image.

Figure 7:
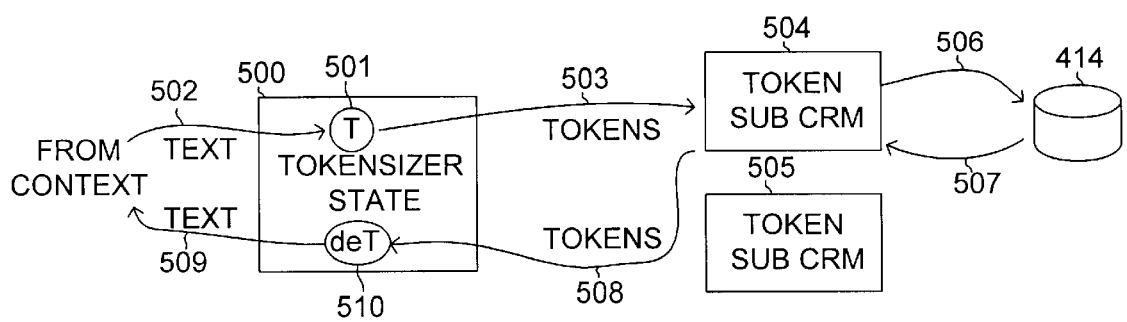
FIG. 7 is a diagram of an operation of the tokenizer CRM of FIG. 5.

FIG. 7 is a diagram of this operation of tokenizer state 500. The tokenizer state 500 does not do a transformation itself, but rather uses a tokenizer 501 to convert a stream of HTML text 502 into a stream of conceptual tokens 503. These tokens 503 are passed through a series of tokenizer sub-modules 504 and 505 that modify, insert, remove, and/or reorder the tokens. The set of tokenizer sub-modules is operator modifiable in the same way the set of CRMs is. In this example, tokenizer sub-module 504 passes the image name 506 from the image tag to cache 414. This image name identifies the stored size information (height and width) for the image which is returned 507 to the sub-module 504. This size information is then inserted to create an appropriately modified token stream 508. This modified token stream 508 is then converted into a modified HTML text stream 509 by a detokenizer 510 of the tokenizer state 500. This modified HTML is then passed back 509,420 to CTX 413.

When CTX 413 gets the HTML data back, it causes rules 408 to be evaluated again. It then returns from the "Push-Data" function call and passes 421 the modified HTML (that now includes the image size information and has had malformed or quirk-causing HTML removed) back to proxy server application 400. The requested HTML is then passed back to the requesting client 102. Client 102 receives the HTML and begins to render the background page using the size information in the image tag. Client 102 begins to render the background page before it has received or even requested the actual image data itself. The above-described "perceived latency" problem is therefore solved.

Client 102 then issues a request for the image data to proxy server 108. Proxy server 108 examines cache 414 and determines whether the image data is cached there. If the image data is cached, then proxy server 108 returns the image data reformatted as appropriate based on the determined client capabilities. Multiple versions of the image may be cached, the one of these version that is appropriate for the requesting client is determined by the client capabilities. Alternatively, only one version of the image data is cached, and this version is reformatted as necessary. The client capabilities are used to determine how the reformatting should be done for the requesting client.

In the present example, the proxy server 108 does not have the requested image data cached. Proxy server 108 therefore issues a request for the image data from the remote server 118. When remote server 118 responds with the image data, proxy server 108 creates another context by passing in the content-length, content-type, user-agent and client capabilities for the image data request. Proxy server application 400 then calls the "PushData" function on the context and evaluates the rules to generate a list of CRMs to use and for each listed CRM a set of input control parameters. In this example, all image reformatting is performed by one CRM, the image CRM 404. CRM 405 performs audio reformatting.

In this example, the image data as received from remote server 118 is of higher resolution than can be displayed on the display of the requesting client. A new state of the image CRM 404 is created using input parameters that cause the image CRM 404 to output image data of appropriate resolution for the display of the requesting client 102. The context passes the image data into the image CRM state, and receives the processed image data back. The context returns from the "PushData" function call by sending processed image data (now of appropriate resolution for the display of the requesting client 102) to proxy server application 400 which in turn passes the image data back to requesting client 102. Client 102 uses the image data to fill in the blank space left in the background page for the image, thereby rendering the completed web page. Image data can be processed as a series of chunks, with each individual chunk being processed through the proxy server application, the context and the appropriate CRMs, and back to the proxy server application as described above thereby facilitating streaming.

When the reformatting is finished, the method Delete-Context is called by the proxy server application 400. Because the context follows a reformatting operation through from beginning to end, it is possible to store transformation statistics (total computation time, mean-square-error, and interesting conditions) in the context for the proxy server application 400 to use. For that reason, the proxy server application 400 is in complete control of the lifetime of a context.

The CRM

The CRMs do the specialized work involved in a content transformation. There is one instantiation of each CRM per machine, although multiple threading allows the same instance to be working on multiple transformations simultaneously. Four CRMs are provided with the standard proxy server platform. The first CRM is a page patcher. The second CRM is a tokenizer. The third CRM handles image transformations and supports data streaming. The fourth CRM handles audio transformations and supports data streaming. The behavior of these CRMs is modifiable via a set of input control parameters specific to each CRM. Selection of these input control parameters on a per request basis is done by evaluating the rules 408. Each CRM designer should publish a list of supported input control parameters (probably in an XML file) along with their default values and acceptable ranges if the CRM is to be included in the rules 408. These input control parameters in many cases give operators all the flexibility they need without having to write their own CRMs. However, in the event that very specialized processing need occur (for example to workaround a bug found in a specific client), the operator has the option of writing custom CRMs (custom CRMs and custom sub-CRMs). These custom CRMs may either precede, follow, or replace the CRMs supplied with the platform. The CRMs present are listed in list 409. The operator can add CRMs to list 409. The operator can also delete CRMs from list 409.

Because streaming CRMs like the audio module may be invoked multiple times before a transformation is complete, temporary storage of state information is requisite. This state information is stored in a module state object and is kept in the context itself. Streaming transformations also create the possibility that multiple CRMs may be working on different parts of a data stream simultaneously. Therefore the context actually holds a list of module states which are accessed with a CRM identifier (either an assigned ID or the CRM's pointer). Similarly, buffering is done on a per CRM basis, and these buffers are stored in the module states. The CRM interface involves four functions: DigestParams, CreateNewState, DeleteState, and Initialize. HRESULT DigestParams ([in] RawParamType rawParams, [out] IWtvCRMParamType digParams). This function "Digest-Params" is called when the rules are compiled at proxy server 108 initialization, and when the rules 408 are changed with the CACIS interface 406. The raw textual input control parameters may be a simple semi-colon delimited string of tag value pairs, some other structure, or they may be looked up individually in some other way by the CRM. The CRM parses the raw input control parameters and converts those raw input control parameters into a compact and optimized structure whose form is known only to itself and its module state. This optimized format is known as the digested parameters and is returned to the CRF configuration object via a generic COM interface pointer. In this way, the framework can demand certain base-level functionality from the digested parameters (like dumping their contents to a log) without dictating or knowing exactly what their internal structure is. These digested parameters are stored with the CRM pointers in the internal representation (rule trees) of the rules in the rules portion 408 of the configuration object 407**. Every time a content transformation is initiated, the digested parameters are used rather than the raw parameters. Therefore the work of parsing, compressing, optimizing, and bound checking the input parameters is done only once for each rule upon system start up.

HRESULT CreateNewStates ([in] IWtvCRMParamType* params, [in] IWtvCRFContext* context, [out] IWtvCRM-States** moduleState). This function is called by the context once for each CRM involved in a transformation. The context then interacts with the module state to process the data. CRMs store the parameters in the module state for reference across multiple invocations on the same transformation.

HRESULT DeleteState ([in] IWtvCRMState* moduleState). This function is called when a transformation has finished and the CRM's state information is not longer needed.

The CRM State

The CRM state is a necessary object because data arriving is often times processed in chunks. The context needs a way to store the state of a CRM's work (for example, parameters and temporary data) while waiting for new data to arrive. The CRMState itself does the work of the transformation (although it can be viewed as an internal component of the CRM, as is done in FIG. 5). The CRMState interface has four functions: ProcessData, IsStreaming, MinimumInputData, GetSpool, and GetStats. The data is pushed through the CRMState by the Context and returned to the context with ProcessData. The context uses the two functions "IsStreaming" and "MinimumInputData" to determine how best to buffer the incoming data. Partial incoming data is given to the CRMState only if it can stream and if the amount of data available exceeds the minimum input data for streaming. Otherwise, the context buffers the data until more arrives. GetSpool is a way to avoid unnecessary data copying between the context and module state. In essence, they share the same data area in an efficient manner. GetStats is a way for the context to cull generic statistical information from the module state even though the context does not know what sort of specific transformation is being done by the module state. The statistics are returned to the context via a generic COM interface pointer which dictates certain minimum requirements for the statistics structure (for example, outputting its contents to a log file). Hence, the platform software is able to calculate metrics and/or warehouse content transformation statistics, even for transformations written by platform operators or third party software vendors.

The Context

The context records information for a particular transformation including the original and current request variables, module states, and buffered input data. Because the data is often received by the server in chunks, a transformation may be suspended until more data is available. The context records which CRMs are working on a data stream. If those CRMs are streaming, then the context immediately passes the data to the CRMs for processing. For non-streaming transformations, the context buffers the data for the CRM until the STREAM_END indicator is received. At that point, the context calls the CRM for processing.

The context keeps track of CRMs involved in a transformation by maintaining the CRM list generated by evaluation of the rules 408 when the transformation begins. This list contains pointers and a flag for each pointer which the context must update as the transformation proceeds. The flag may have the following values: 1) Value WTV_CRM_ACTIVE which means that the CRM is working on the data stream but is suspended; 2) Value WTV_CRM_FINISHED which means that the CRM has completed its work on the stream or whole data set; and 3) Value WTV_CRM_PENDING which means that the CRM is scheduled for future invocation.

The list produced by evaluation of the rules 408 is a function of the request variables and/or client capabilities. The client capabilities are determined by the proxy server application (the proxy server can determine the client capabilities from information indicative of client capabilities, or the client capabilities themselves may be passed from the client to the proxy server) and remain constant throughout a transformation, but some of the request variables (namely content-type and content-length) may change during reformatting. In the event request variables change, the rules 408 are reevaluated, thereby generating a possibly different list of CRMs. In order to prevent looping, the context will only invoke CRMs from newly generated lists with a flag equal to WTV_CRM_PENDING.

The context interface involves the following ten functions: PushData, Initialize, GetOrigContentLength, GetOrigContentType, GetCurContentLength, GetCurContentType, GetUserAgent, GetClientCapabilities, SetCurContentLength, and SetCurContentType.

HRESULT PushData ([in] StreamType* pInStream, [in] StreamType* pOutStream, StreamStatusType* streamStatus). This function is called by the proxy server application to send data to and retrieve data from the context. If the transformation is performed by non-streaming CRMs, then the proxy server application can expect to push data several times (until streamStatus=STREAM_END) before getting back any data. When the last PushData call returns, the entire file should be returned. For streaming transformations, data may be returned with each call to PushData. The streamStatus can have one of the following values: 1) Value STREAM_CONT which means that more data is expected; 2) Value STREAM_END which indicates the legitimate or expected end of data; and 3) Value STREAM_ERROR which indicates a premature or unexpected end of data and/or network failure.

HRESULT Initialize ([in] unsigned int contentLength, [in] BSTR contentType, [in] BSTR userAgent, [in] ClientCapType* clientcaps, [in] ConfigType* curconfig). This function is called by the CreateNewContext function. The context stores the first four arguments for future use by the proxy server application and CRMs. Each context maintains a pointer to the configuration with which it was created. That way, even if a new configuration is created during the course of a transformation, the transformation will continue to use the older configuration.

The following six functions are used by the proxy server application to get original and updated request variables: HRESULT GetOrigContentLength ([out] unsigned int* origContentLength); HRESULT GetOrigContentType ([out] BSTR* origContentType); HRESULT GetCurContentLength([out] unsigned int* curContentLength); HRESULT GetCurContentType ([out] BSTR* curContentType); HRESULT GetUserAgent ([out] BSTR* userAgent); and HRESULT GetClientCapabilities ([out] ClientCapType** clientcaps). The following two functions are used by CRMs to update the request variables during a transformation. Calling these functions with a value different from the original causes a reevaluation of the rules. The user-agent and client-caps do not change for a given request, so they do not have analogous "set" functions. The two functions are: HRESULT SetCurContentLength [in] unsigned int newContentLength); and HRESULT SetCurContentType ([in] BSTR newContentType). If any of the request variables are changed mid-transformation, it will lead to a reevaluation of the rules and a possible change in the pending module list.

Declaration of Suitability

Web content on remote server 118 is also cached in cache 414. When a client requests the web content, proxy server application 400 determines whether the cached web content is suitable for supplying back to the requesting client in lieu of retrieving the web content from the remote server 118 and supplying that newly retrieved web content back to the requesting client. In one example, first client 102 requests the web content. The proxy server 108 retrieves the web content, reformats the retrieved web content, stores the reformatted web content in cache 414 and also forwards the reformatted web content back to the first requesting client 102. Second client 103 then requests the same web content from the proxy server. If the web content cached is in an appropriate format for the client capabilities of the second client 103, then the proxy server should forward the cached web content back to the second client 103 to speed the second client's access to the web content. If, on the other hand, the web content cached is in a format inappropriate for the second client 103 (for example, the second client 103 will function in an undesirable manner were it to attempt to decipher and/or use the web content as cached on cache 414), then the proxy server should not forward the cached web content as cached but rather should forward the web content in a suitable format for the requesting second client 103. The proxy server may either reform the cached web format and then forward the reformatted web content to the requesting client or the proxy server may retrieve the web content from the remote server, reformat the newly retrieved web content into the suitable format, and then forward that reformatted content back to the requesting client.

The proxy server application 400 determines whether particular cached web content is suitable in one embodiment by storing particular information with the cached web content. When the first client requests the web content and the proxy server reformats that web content, the rules are evaluated as described above. Depending on the particular request variables of the request and/or client capabilities determined for the request, each individual rule evaluates to be either true or false. For each rule evaluated as true, an ordered list of CRMs to be used in the reformatting and input control parameters to control operation of the CRMs are generated as described above in connection with FIG. 5. This information, along with a pointer to the particular rules that were evaluated, is then cached in cache 414 along with the reformatted web content.

When second client 103 requests the web content from the proxy server application, the request variables and/or client capabilities for the second request are then used to evaluate the rules. As in the case of the first request, a list of CRMs and associated input control parameters are determined. To determine whether the cached web content is suitable for the second client 103, the proxy server application 400 compares the rules that evaluated as true, the list of CRMs to use, and the associated input control parameters as cached with the ones determined for the second request. If the same rules are used, and if the same rules evaluate to true, then the cached web page is determined to be suitable for passing on to the second client. In such a case, the processing that would be performed for the second request would be the same as that for the first request.

If, on the other hand, the rules used or the rules that evaluated to true are not the same as those for the first request, then the web content is determined not to be suitable for passing on the second client. The web content is therefore reformatted in accordance with the list of CRMs and associated input control parameters as determined for the second request. Although this technique for determining suitability involves a reevaluation of the rules for the second request, other techniques are possible. In one suitable technique, the client capabilities of the requesting client are used to determine if the cached information is suitable. For example, the x resolution, y resolution, and bit depth client capabilities of the second client 103 are used in one embodiment to determine whether a cached image having a particular resolution is suitable for the second client or whether the image should be reformatted before being supplied to the second client.

Email Server Application

Although modular CRF and CRM reformatting software is described in connection with a proxy server application 400 in FIG. 5, applications other than a proxy server application can use the modular CRF and CRM reformatting software. An email server application uses the modular CRF and CRM reformatting software in one embodiment to reformat an attachment on an email message into a format that the client can decipher.

In a first step, an email message is received by a mail application running on server 108. The email message is stored in a mail store. Next, client establishes a connection to server 108 and the email server. When this connection is established, the client passes information indicative of client capabilities to the email server. Actual client capabilities may be passed to the server or information indicative of client capabilities may be passed to the server and the server determines associated client capabilities using a client capabilities database (CCD). The email server then retrieves the email message for the client from the mail store, evaluates the rules using the client capabilities as input, and processes the email message in a similar way to the way the HTML was processed in the example described above in connection with FIG. 5. Only here, no processing needs to be done on the email message itself. Accordingly, no CRM is called. The email message is not passed back to the client immediately, rather processing is done on the attachment. The email server separates the attachment from the email message and then reformats the attachment. Similar to the way the image was reformatted in the example described above in connection with FIG. 5, a new context is created and the client capabilities of the client are used to determine which CRMs will process the attachment and what input control parameters will be used to control operation of those CRMs. The data of the attachment is then pushed onto the appropriate CRMs for processing and the processed data is returned back to the context. Once the reformatting of the attachment is completed, the attachment is inserted back into the email message and the email message is sent to the client. If, for example, the client cannot decipher an attachment of a first image format but can decipher images of a second image format, and if email for the client were to be received onto the email server where the email had an attachment in the first image format, then the email server would use the client capabilities to determine to reformat the attachment into the second image format before forwarding the email back of the client. The client could therefore decipher the email attachment even though it could not have deciphered the original unreformatted attachment. In some embodiments, the email is reformatted and stored in the mail store in the reformatted form so that when the client established a connection and retrieves the email message, the client receives the reformatted email message. In other embodiments, the email is not stored in the reformatted format but rather is stored in the mail store in the original format. When the client requests the email, the email message is retrieved and reformatted then immediately prior to be passed back to the client.

Although the present invention is described in connection with certain specific embodiments for instructional purposes, the present invention is not limited thereto. In some embodiments, the information indicative of client capabilities is actual client capabilities passed to the server from the requesting client, whereas in other embodiments the information indicative of client capabilities is information used by the server to determine the client capabilities of the requesting client. In some embodiments, the proxy server receives a request variable (for example, user-agent) from the client but receives other request variables (for example, content-length and content-type) from the remote server. Conventional programming techniques other than the COM programming standard can be employed to realize the modular aspect of the modular server platform in accordance with an aspect of the invention. Software that carries out steps of methods in accordance with the present invention can be stored on a computer-readable medium. Examples of computer-readable mediums include magnetic and optical storage media and semiconductor memory. Accordingly, various modifications, adaptations, and combinations of various features of the described embodiments can be practiced without departing from the scope of the invention as set forth in the claims.

What is claimed is:

1. A method, comprising:
   a. retrieving onto a proxy server content from a remote server, the proxy server comprising a first module and a second module, each of the first and second modules comprising executable code that is dynamically, linked into the proxy server at a run time of the proxy server;
   b. reformatting the content into first reformatted content using the first module aid not using the second module;
   c. reformatting the content into second reformatted content using the second module and not using the first module;
   d. receiving a request from a first client onto the proxy server for the content;
   e. supplying the first reformatted content to the first client from the proxy server, wherein the supplying of the first reformatted content involves determining that the first reformatted content is to be supplied to the first client based at least in part on a request variable from the request from the first client;
   f. receiving a request from a second client onto the proxy server for the content; and
   g. supplying the second reformatted content to the second client from the proxy server, wherein the supplying of the second reformatted content involves determining that the second reformatted content is to be supplied to the second client based at least in part on a request variable from the request from the second client.

2. The method of claim 1, wherein:
   the supplying of the first reformatted content to the first client from the proxy server involves determining that the first reformatted content is to be supplied to the first client based at least in part on information indicative of client capabilities of the first client, the information indicative of client capabilities of the first client being present in the request from the first client, and
   the supplying of the second reformatted content to the second client from the proxy server involves determining that the second reformatted content is to be supplied to the second client based at least in part on information indicative of client capabilities of the second client, the information indicative of client capabilities of the second client being present in the request from the second client.

3. The method of claim 2, wherein the client capabilities of the first client includes an indication of an amount of memory storage space on the first client, and wherein the client capabilities of the second client includes an indication of an amount of memory storage on the second client.

4. The method of claim 2, wherein the client capabilities of the first client includes an indication of an amount of disk storage space on the first client, and wherein the client capabilities of the second client includes an indication of an amount of disk storage on the second client.

5. The method claim 2, wherein the client capabilities of the first client includes an indication of a resolution of a display of the first client, and wherein the client capabilities of the second client includes an indication of a resolution of a display of the second client.

6. The method of claim 2, wherein the client capabilities of the first client includes an indication of a performance of a connection to the first client, and wherein the client capabilities of the second client includes an indication of a performance of a connection to the second client.

7. The method of claim 6, wherein the connection to the first client is a dial-up connection, and wherein the connection to the second client is a dial-up connection.

8. The method of claim 6, wherein the connection to the first client is a DSL connection, and wherein the connection to the second client is a DSL connection.

9. The method of claim 6, wherein the connection to the first client is a cable modem connection, and wherein the connection to the second client is a cable modem connection.

10. The method of claim 2, wherein the client capabilities of the first client includes an indication of an amount of cache memory on the first client, and wherein the client capabilities of the second client includes an indication of an amount of cache memory on the second client.

11. The method of claim 2, wherein the client capabilities of the first client includes an indication that the first client is enabled for a particular image data format, and wherein the client capabilities of the second client includes an indication that the second client is enabled for a particular image data format.

12. The method of claim 2, wherein the client capabilities of the first client includes an indication that the first client is enabled for a particular audio data format, and wherein the client capabilities of the second client includes an indication that the second client is enabled for a particular audio data format.

13. The method of claim 2, wherein the client capabilities of the first client includes an indication of a processor clock speed of the first client, and wherein the client capabilities of the second client includes an indication of a processor clock speed of the second client.

14. The method of claim 2, wherein the information indicative of client capabilities of the first client includes a first software build number, and the information indicative of client capabilities of the second client includes a second software build number.

15. The method of claim 2, wherein the information indicative of client capabilities of the first client includes a software version number, and the information indicative of client capabilities of the second client includes a second software version number.

16. The method of claim 1, wherein the proxy server comprises a tokenizer module and a tokenizer sub-module, the proxy server generating the reformatted content by:

causing the tokenizer module to process the content so as to output tokens; and causing the tokenizer sub-module to operate on the tokens.

17. A method as recited in claim 1, further comprising:

generating a third dynamically-linkable module;

loading the third dynamically-linkable module onto the modular proxy server; and using the third dynamically-linkable module to reformat the content in accordance to a request received by a third client of the modular proxy server, and based at least in part on one or more of a request variable and a client capability that is specifically identified in the client request of the third client.

18. The method of claim 17, further comprising:

(a) before the generating of the third dynamically-linkable module, using at least one of the first and second dynamically-linkable modules to reformat the content.

19. A method as recited in claim 1, wherein the content requested by the first client includes an email message.

20. A proxy server configured to implement the method recited in claim 1, the proxy server being configured to dynamically access the first and second modules at run-time.

21. A computer program product comprising one or more computer-readable media having computer-executable instructions for implementing the method recited in claim 1.

* * * * *